3,478,059
1,4-BENZODIOXAN-6-YL AMINO ACIDS
John T. Suh, Mequon, and Joseph A. Skorcz, Milwaukee, Wis., assignors to Colgate-Palmolive Company, New York, N.Y., a corporation of Delaware
No Drawing. Filed Apr. 15, 1968, Ser. No. 721,167
Int. Cl. C07d 15/18; A61k 27/00
U.S. Cl. 260—340.4     8 Claims

ABSTRACT OF THE DISCLOSURE

The compounds are 2-alkyl-3-(1,4-benzodioxan-6-yl)-alanines which are useful as chelating agents for heavy metal ions and as central nervous system stimulants. A species disclosed is 2-methyl-3-(1,4-benzodioxan-6-yl)-alanine.

SUMMARY OF THE INVENTION

The present invention relates to novel aminoacids of the formula

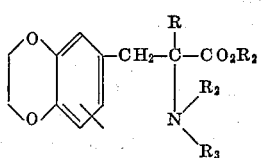

in which X is hydrogen or halo such as chloro or bromo, R is hydrogen, lower alkyl of 1 to 4 carbon atoms, phenyl, a cycloalkyl of 3 to 7 carbon atoms such as cyclopropyl or cyclohexyl, a cycloalkyl-lower alkyl in which the cycloalkyl has 3 to 7 carbon atoms such as cyclohexyl ethyl or cyclopentyl methyl and a phenyl-lower alkyl of 7 to 13 carbon atoms such as benzyl, phenylisopropyl and phenethyl, $R_1$ is hydrogen or lower alkyl and $R_2$ and $R_3$ are selected from hydrogen, a lower alkyl of 1 to 4 carbon atoms, a cycloalkyl of 3 to 7 carbon atoms such as cyclopropyl or cyclohexyl, a cycloalkyl-lower alkyl in which the cycloalkyl has 3 to 7 carbon atoms such as cyclohexyl ethyl or cyclopentyl methyl and a phenyl-lower alkyl of 7 to 13 carbon atoms such as benzyl, phenylisopropyl and phenethyl.

The compounds of the present invention are preferably prepared by reacting 3,4-dihydroxyphenylacetic acid with methanol containing a small amount of sulfuric acid under reflux to form the corresponding methyl ester. The ester is then treated with ethylene dibromide and potassium carbonate in acetone at reflux to form the 1,4-benzodioxan-6-acetic acid methyl ester which can be hydrolyzed in the presence of sodium hydroxide in methanol to form the 1,4-benzodioxan-6-acetic acid. If desired, the 1,4-benzodioxan-6-acetic acid may also be prepared directly from 3,4-dihydroxyphenylacetic acid by treating it with ethylene dibromide and potassium hydroxide in water under reflux while bubbling nitrogen through the reaction mixture.

The 1,4-benzodioxan-6-acetic acid may then be treated with an organometallic agent, for example, methyl lithium in ether in an ice bath, to form the 6-acetonyl-1,4-benzodioxan. The thus formed ketone may be treated with ammonium carbonate and potassium cyanide in 50% aqueous ethanol at reflux to form the 5-methyl-5-(1,4-benzodioxan-6-yl)methylhydantoin. The thus formed hydantoin may then be treated with barium hydroxide in water under reflux to form the desired 2-methyl-3-(1,4-benzodioxan-6-yl)-alanine.

The described process may be illustrated as follows:

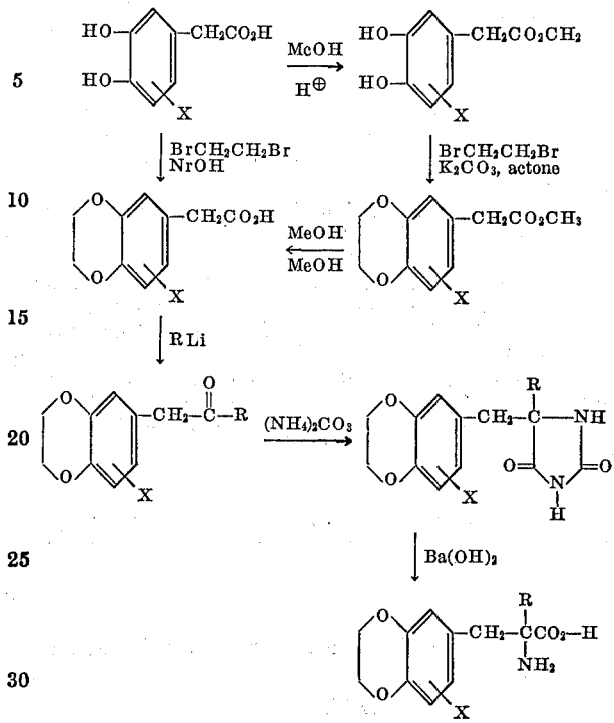

in which X and R are as previously described and do not interfere with or partake in the reaction.

The compounds in which $R_1$ is other than hydrogen such as, for example, an alkyl such as methyl, may be readily prepared by conventional esterification techniques.

The compounds in which $R_2$ and $R_3$ are other than hydrogen may be prepared by conventional means. For example, the compounds in which $R_2$ and $R_3$ are both methyl may be prepared by treating a primary amine with formic acid and formaldehyde. Amines in which $R_2$ is benzyl may be prepared by treating the primary amine with benzaldehyde and then treating the resulting product with sodium borohydride or hydrogen in the presence of a suitable catalyst such as Raney nickel to form the corresponding benzylamino derivative. The monomethyl amino compound may be prepared by treating the benzylamino derivative with formic acid and formaldehyde to form the methyl benzylamino derivative which upon catalytic cleavage yields the monomethyl derivative.

The compounds in which $R_2$ is cycloalkyl may be prepared by treating a corresponding primary amine with a suitable ketone such as cyclohexanone in the presence of hydrogen in ethanol to form the corresponding amine.

Representative of the compounds which may be prepared by the described processes are:

2-methyl-3-(1,4-benzodioxan-6-yl)-alanine,
2-ethyl-3-(1,4-benzodioxan-6-yl)-alanine,
2-phenyl-3-(1,4-benzodioxan-6-yl)-alanine, and
2-benzyl-3-(1,4-benxodioxan-6-yl)-alanine.

Pharmaceutically acceptable salts of the novel compounds may be prepared by reacting the amino acid in a suitable mutual solvent with an acid such as formic acid, citric acid, maleic acid, sulfuric acid, hydrohloric acid, succinic acid, tartaric acid, benzoic acid and fumaric acid.

The compounds of the present invention may be employed as chelating agents in chemical processes in which it is desirable to inactivate heavy metal ions, especially ferric ions. The compounds can simply be dissolved in warm water and added to the aqueous mixture containing the heavy metal ions in an amount calculated to be sufficient to inactivate the ions.

In addition, the compounds are pharmacologically active as central nervous system stimulants. For example, the compound 2-methyl-3-(1,4-benzodioxan-6-yl)-alanine in mouse behavioral screening exhibited central nervous system stimulant activity. In mice receiving 30 to 1,000 mg./kg. of the compound intraperitoneally in the form of an aqueous solution, behavior characteristics of mood elevation, autonomic nervous system and central nervous system stimulation were observed. As a result of the behavioral studies the compound was found to have an $LD_{50}$ in excess of 3,000 mg./kg. The behavioral studies were conducted in accordance with the procedure set forth by Irwin in "Animal and Clinical Pharmacologic Techniques in Drug Evaluation," J. H. Nodine and P. E. Siegler, Ed., Year Book Medical Publishers, Inc. 1964, pp. 36–54.

When employed as pharmaceutical agents the novel amino acids are preferably combined with conventional pharmaceutical diluents, flavoring agents, disintegrating and lubricant ingredients and formed into conventional oral unit dosage forms such as capsules, tablets and the like, and parenteral dosage forms such as solutions. Generally the tablets or capsules will contain 150 to 500 mg. of the active ingredients.

The number of tablets or capsules an individual patient may receive in a given 24 hour period will, of course, depend upon the amount of medication contained in the unit dosage form selected and the patient's condition.

The following examples illustrate the practice of the invention:

EXAMPLE 1

3,4-dihydroxyphenylacetic acid methyl ester

A solution of 3,4-dihydroxyphenylacetic acid (50.5 g., 0.3 mole) in 400 ml. of methanol containing 4 ml. of concentrated $H_2SO_4$ is refluxed for 5 hours, then evaporated to near dryness. To the residue is added 200 ml. of chloroform and with stirirng 140 ml. of 4% aqueous $Na_2CO_3$. The organic layer is separated, washed with saturated brine, dried ($Na_2SO_4$), and evaporated to yield an amber gum.

EXAMPLE 2

1,4-benzodioxan-6-acetic acid methyl ester

A mixture of 3,4-dihydroxyphenylacetic acid methyl ester (4.92 g., 0.027 mole), ethylene dibromide (7.5 g., 0.04 mole), $K_2CO_3$ (7.5 g., 0.054 mole) in 125 ml. of acetone is stirred and refluxed for 42 hours, then cooled and filtered. Evaporation of the filtrate affords an amber oil which is eluted from a silica column with chloroform-acetone (5:1) to give 1,4-benzodioxan-6-acetic acid methyl ester in the form of a yellow oil.

*Analysis.*—Calcd. for $C_{11}H_{12}O_4$: C, 63.45; H, 5.81. Found: C, 63.79; H, 5.93.

EXAMPLE 3

1,4-benzodioxan-6-acetic acid

A solution of the undistilled ester of Example 2 (2.3 g., 0.011 mole) and 1.3 g. (0.033 mole) of NaOH in methanol (25 ml.) water (5 ml.) is stirred at 25° for 4 hours, then evaporated to dryness. The solid residue is dissolved in water (40 ml.), cooled and acidified with 4 N HCl. The resulting oil solidifies with continued cooling, and the pale tan crystals are filtered, washed with water, and dried. The 1,4-benzodioxan-6-acetic acid melts at 73–74.5° after recrystallization from benzene-petroleum ether.

*Analysis.*—Calcd. for $C_{10}H_{10}O_4$: C, 61.85; H, 5.19; neut. equiv. 194.19. Found: C, 61.74; H, 5.20; neut. equiv. 194.19.

EXAMPLE 4

1,4-benzodioxan-6-acetic acid

A solution of 3,4-dihydroxyphenylacetic acid (16.8 g., 0.1 mole), ethylene dibromide (28.2 g., 0.15 mole), and KOH (18.5 g., 0.33 mole) in 100 ml. of water is refluxed for 4 hours while nitrogen is bubbled through the solution. After being cooled to room temperature, the deep brown solution is extracted with ether, acidified with 10% HCl, and re-extracted with two 250 ml. portions of ether which are combined, washed with brine, dried ($Na_2SO_4$), and evaporated. The remaining oil is eluted from silica with benzene-ether (1:1) to give an oil which solidifies on standing. Recrystallization provided 1,4-benzodioxan-6-acetic acid in the form of white needles, M.P. 70–72.

EXAMPLE 5

6-acetonyl-1,4-benzodioxan

To a solution of methyl lithium prepared from 6.31 g. (0.91 g.-atm.) of lithium wire and 70.95 g. (0.5 mole) of methyl iodide in 1400 ml. of ether is added 25.2 g. (0.13 mole) of 1,4-benzodioxan-6-acetic acid in 300 ml. of ether. The reaction mixture is stirred for 18 hrs. in an ice bath, then carefully treated with methanol (25 ml.) in ether, followed by 300 ml. of water. The aqueous layer is separated and washed twice with ether. The combined ether portions are washed twice with saturated $NaHCO_3$ solution, once with brine, dried ($Na_2SO_4$), and evaporated to dryness Distillation of the residual liquid affords 6-acetonyl-1,4-benzodioxan in the form of a pale yellow liquid, B.P. 105–107° (0.04 mm.).

*Analysis.*—Calcd. for $C_{11}H_{12}O_3$: C, 68.73; H, 6.30. Found: C, 68.55; H, 6.37.

EXAMPLE 6

5-methyl-5-(1,4-benzodioxan-6-yl)methylhydantoin

A mixture of 6-acetonyl-1,4-benodioxan (18.8 g., 0.098 mole), $(NH_4)_2CO_3$ (100.6 g., 0.882 mole), and KCN (7.9 g., 0.137 mole) in 500 ml. of 50% aqueous ethanol is refluxed for 25 hrs. The majority of the solvent is removed by distillation, then the remaining solution is extracted with ether and acidified with concentrated HCl. The precipitated solid is filtered, washed with water, and dried to afford 5-methyl-5-(1,4-benzodioxan-6-yl)methylhydantoin in the form of a white powder, M.P. 187.5–189°.

*Analysis.*—Calcd. for $C_{13}H_{14}N_2O_4$: C, 59.54; H, 5.38; N, 10.68. Found: C, 59.46; H, 5.30; N, 10.30.

EXAMPLE 7

2-methyl-3-(1,4-benzodioxan-6-yl)-alanine

A mixture of 5-methyl-5-(1,4-benzodioxan-6-yl)methylhydantoin (10.5 g., 0.04 mole) and 53.6 g., (0.17 mole) of barium hydroxide octahydrate in 400 ml. of water is refluxed for 3 days and then filtered while hot. The insoluble solids are washed with warm water which is combined with the filtrate, acidified with concentrated $H_2SO_4$, stirred with diatomaceous earth, and filtered. The filtrate is brought pH 7 with dilute NaOH, concentrated to approximately 100 ml., diluted with 100 ml. of acetone, cooled, and filtered of any precipitated material. The resulting aqueous acetone filtrate then is diluted to 1 liter with additional acetone and refrigerated to afford 2-methyl-3-(1,4-benzodioxan-6-yl) alanine in the form of whie powder, M.P. 279–281.5°.

*Analysis.*—Calcd. for $C_{12}H_{15}NO_4$: C, 60.75; H, 6.38; N, 6.17. Found: C, 59.91; H, 6.21; N, 6.37.

We claim:

1. A compound selected from the group consisting of a compound and pharmaceutically acceptable acid addition salts thereof of the formula

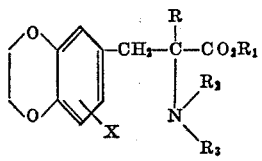

in which X is hydrogen, R is hydrogen, lower alkyl or a phenyl-lower alkyl of 7 to 13 carbon atoms, $R_1$ is hydrogen or lower alkyl and $R_2$ and $R_3$ are hydrogen, lower alkyl of 1 to 4 carbon atoms, or a phenyl-lower alkyl of 7 to 13 carbon atoms.

2. A compound of claim 1 in which X and R are hydrogen.

3. A compound of claim 1 in which

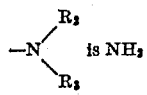

4. A compound of claim 1 in which $R_1$ is lower alkyl.

5. A compound of claim 1 in which R is lower alkyl.

6. A compound of claim 1 in which X, R and $R_1$ are hydrogen and R is methyl.

7. A compound of claim 1 in which X is chloro or bromo.

8. A compound of claim 1 in which $R_2$ and $R_3$ are hydrogen or lower alkyl.

References Cited
UNITED STATES PATENTS 1,964,973  7/1934  Bockmühl et al. ____ 260—340.3

ALEX MAZEL, Primary Examiner

J. H. TURNIPSEED, Assistant Examiner

U.S. Cl. X.R.

424—278